United States Patent [19]
Zhang

[11] Patent Number: 5,515,394
[45] Date of Patent: May 7, 1996

[54] ONE DIMENSIONAL BEAM EXPANDING CAVITY FOR DIODE-PUMPED SOLID-STATE LASERS

[76] Inventor: Tong Zhang, 245 S. 800 E., #6, Salt Lake City, Utah 84102

[21] Appl. No.: 43,006

[22] Filed: May 28, 1993

[51] Int. Cl.$^6$ .................................................. H01J 3/093
[52] U.S. Cl. ............................................. 372/72; 372/101
[58] Field of Search .............................. 372/71, 72, 20, 372/100, 101

[56] References Cited

U.S. PATENT DOCUMENTS

| | | | |
|---|---|---|---|
| 4,756,003 | 7/1988 | Baer et al. .................................. | 372/13 |
| 4,794,615 | 12/1988 | Berger et al. ............................. | 372/75 |
| 4,879,722 | 11/1989 | Dixon et al. ............................... | 372/75 |
| 4,945,544 | 7/1990 | Tanaka et al. . | |
| 5,077,751 | 12/1991 | Kudo et al. . | |
| 5,103,457 | 4/1992 | Wallace et al. . | |
| 5,139,609 | 8/1992 | Fields et al. . | |
| 5,249,189 | 9/1993 | Scheps ........................................ | 372/20 |
| 5,260,963 | 11/1993 | Baird et al. ................................ | 372/69 |
| 5,268,978 | 12/1993 | Po et al. ..................................... | 372/71 |

OTHER PUBLICATIONS

Walter Koechner: Solid–state Laser Engineering, 3rd ed., Springer Ser. Opt. Sci., vol. 1 (Springer, Berlin, Heidelberg Jan. 1991).

Tidwell et al. "Highly efficient 60–W TEM$_{00}$ cw diode–end–pumped Nd:YAG laser", Optics Lett. 18(Jan. 1993)2, 116.

Yushi Kaneda et al., "7.6 W of continuous–wave radiation in a TEM$_{00}$ mode from a laser–diode end–pumped Nd:YAG laser", Optics Lett. 17 (Jan. 1992) 14, 1003.

Larry R. Marshall et al. "Highly efficient TEM$_{00}$ operation of transversely diode–pumped Nd:YAG lasers", Optics Lett. 17(Jan. 1992)3, 186.

Yoshihito Hirano, Cleo'91, CFC4, P490, "Diodepumped hijgh efficiency Nd:YLF laser with reflection type gratings", Jan. 1991.

D. C. Shannon and R. W. Wallace, "High–power Nd:YAG laser end pumped by a cw, 10 mm×1 um aperture, 10–W laser–diode bar", Optics Lett 16(Jan. 1991)5, 318.

*Primary Examiner*—Rodney B. Bovernick
*Assistant Examiner*—Robert E. Wise

[57] ABSTRACT

The pump region (9a–d) in the active medium (1a–d) excited by the pumping source (3a–b) is modeled of a thin layer shape or line shape for the side-pumping, and of a line shape for the end-pumping. The prism beam expander (2) as a mode-expanding device is used to expand TEM$_{00}$ mode in one dimension resulting in a highly mode-matched fashion when the mode-expanding is required.

20 Claims, 6 Drawing Sheets

ONE DIMENSIONAL BEAM EXPANDING CAVITY FOR DIODE-PUMPED SOLID-STATE LASERS

BACKGROUND—FIELD OF INVENTION

The invention relates generally to lasers and more particularly to pump/cavity configurations and designs, including intracavity frequency doubling, for diode-pumped solid-state lasers.

BACKGROUND—DESCRIPTION OF PRIOR ART

Since the recent advances in the development of diode-pumped solid-state lasers, there has been a revolution in the development of high efficiency, extremely compact and stable all-solid-state laser systems. In the latest generation of diode-pumped solid state lasers, the lasing material is pumped by means of diode bar arrays, which is now the best way of the cost effective approaches to increase output power. A wide range of applications can be satisfied by diode-pumped solid state lasers.

Diode-pumped systems based on neodymium or other rare earth doped materials as the gain medium operation on the near infrared region have been particularly widely investigated, due to their high efficiencies. Frequency conversion techniques and laser pumping of other gain materials allow extension of these sources into new spectral regions, producing efficient frequency-agile laser source.

The solid-state lasers have been formerly pumped by a linear flash lamp or by an arc lamp. Compared with the conventional pumping sources, the laser diode promises higher energy efficiency, lower heat generation and longer life.

The diode-pumped solid-state lasers have been usually classified into two types based on the pump scheme, i.e., the transverse (side) pumped type laser and the longitudinal (end) pumped type laser as disclosed in U.S. Pat. No. 4,575,854 and No. 3,982,201, respectively. A side pumped type laser has a diode laser array for lasing the side of a laser rod or bar with the direction transversely to the longitudinal axis of the resonator thereby supplying pumping power to the laser rod or bar, while an end pumped type laser introduces light from a diode laser into the end of a laser rod or bar along the lines of the longitudinal axis of the resonator for supplying the latter with pumping power.

The diode-pumped solid-state lasers have been demonstrated using both end-pumped and side-pumped geometries. However, those systems are not suitable for all applications and there are still problems awaiting solution.

The end-pumping scheme is the best one to obtain mode-matched pumping, that is the overlapping of the pump and resonator $TEM_{00}$ mode volume to optimize the efficiency of energy extraction from laser rod, but has the serious geometrical restriction to employ many diode bars as pump source to increase the output power, and to insert intracavity elements. The end-pumped lasers typically operate at low power range due to the limitation of the pump power that can be focused onto the end of the laser rod. The schematic of using one 2-D diode bar with a microlense array and a macrolense has been described in U.S. Pat. No. 5,139,609. But the geometry makes it incompatible to use many diode bars as pump source. An laser architecture of the angularly multiplexed pump geometry was applied with eight 15-W linear array laser-diode bars to deliver the diode power to the rod end for another design, proposed by S. C. Tidwell et al. (Optics lett 18(1993)2,116). However the cavity design was not compact. On the other hand, there is an ultimate power-scaling limit for a single end determined by the thermal fracture strength of the laser material on both situations. In a word, the pump volume as a point is the major limitation to increase pump power with the end-pumping.

The side-pumped systems, on the other hand, have no difficulty to generate high powers, but it is usually with a lower gain and very hard to obtain the mode-matched pumping with a compact cavity design because the pump light is distributed over a larger volume. Another drawback is that the mode quality is obtained with pumping geometries optimized for high average power operation, which require many diode bars to be arranged in a multifold symmetrical pattern around the laser rods to produce uniform excitation. These geometries are difficult to implement as cost effective low-average power systems. The important improvement in such laser design was achieved by Baer in U.S. Pat. No. 4,785,459 and No. 4,837,771, and by Yoshihito Hirano et al. (CLEO '91, CFC4, P490). But those approaches are still not favorable to use the 2-D stacked laser diode bar and have some other limitations.

The purpose of the present invention is to provide an approach to make the pump region in the active medium enlarged from a point to a line resulting in no restriction to use many diode bars with the end-pumped geometries, and reduced from a large volume to an excited thin layer or a line to provide a favorite condition in the mode-matched pumping and a higher gain with the side-pumped geometries. Therefore the performances of both end-pumping scheme and side-pumping scheme are dramatically enhanced by this invention.

OBJECTIVES

The objective of this invention is to provide a novel pump/cavity configuration for diode-pumped solid-state laser systems.

The relevant pump configurations are characterized by (1) A set of optical pumping schemes with facilitaty, versatility and modularity for both end-pumping and side-pumping which couple the output from one or multiple diode bars with cw or quasi-cw operation, (2) It provides a way for maximizing an absorption of pump power in a small pump volume and leading to a higher gain, (3) It provides a favorable condition for the mode-matched pumping, and $TEM_{00}$ mode and single mode operation, (4) It is capable of significantly increasing the output power of solid-state lasers with the end-pumping scheme, (5) The conventional optical elements are used in the pump coupling optics without the special optical correction elements, (6) compact and high efficiency, (7) very simple construction, easy to manufacture and low cost, (8) the minimum of the number of optical components, (9) a large optical tolerance.

The relevant cavity configuration is characterized by (1) compact, (2) offering a large enough $TEM_{00}$ mode volume in the pump region to achieve efficient mode-matched pumping with stable cavity configurations, (3) suitable for both end-pumping scheme and side-pumping scheme, (4) a stable small beam waist for producing a high power density in the nonlinear crystal to obtain efficient intracavity frequency doubling or mixing and the capability of operating with high frequency stability, and high amplitude stability without serious cavity length control, (5) high capability of the $TEM_{00}$ mode and single longitudinal mode operation, (6) cost effective laser systems with diverse output power.

It is also the objective to provide a solid-state laser system which readily laser with a high output and frequency doubling or mixing.

A further objective of the present invention is to produce a laser system which can be adapted to serve as an amplifier.

Also it is the objective to yield a RE:solid laser system which can be operated in either a cw, quasi-cw or pulsed mode of operation.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DRAWING FIGURES

In the drawings, closely related figures have the same number but different alphabetic suffixes.

| [REFERENCE NUMERALS IN DRAWINGS] | |
|---|---|
| 1a laser bar | 9a excited region |
| 1b laser slab | 9b excited region |
| 1c laser slab | 9c excited region |
| 1d laser bar | 9d excited region |
| 2 prism beam expander | 10 beam waist $W_1$ |
| 3a 2-D stacked laser diode bar | 11 beam waist $W_0$ |
| 3b linear array laser-diode bar | 12 output |
| 4a fiber rod lens array | 13 nonlinear crystal KTP |
| 4b fiber rod lens | 14 etalon |
| 5a cylindrical lens | 15 front mirror |
| 5b cylindrical lens | 16 harmonic output |
| 6 rear mirror | 17 rear mirror |
| 7 front mirror | 18 front mirror |
| 8 collimated pump beams | 20a grating reflector |
| | 20b grating reflector |

DESCRIPTION

The pump regions in the active medium excited by the laser diode conventionally are a volume with the side-pumping scheme, or a point with the end-pumping scheme, or a multi-points with the multiple ends pumping scheme. In the present invention, the pump region is molded to a thin layer shape or a line shape for the side-pumping, and of a line shape for the end-pumping. Concurrently the prism beam expander is used as a mode-expanding device with a compact cavity to expand $TEM_{00}$ mode in one dimension so as to best match the pump region when the mode-expanding is required.

There are several methods with the conventional optical elements to render the pump regions with a linear shape or a thin planar shape.

Figures 1A, 1C:
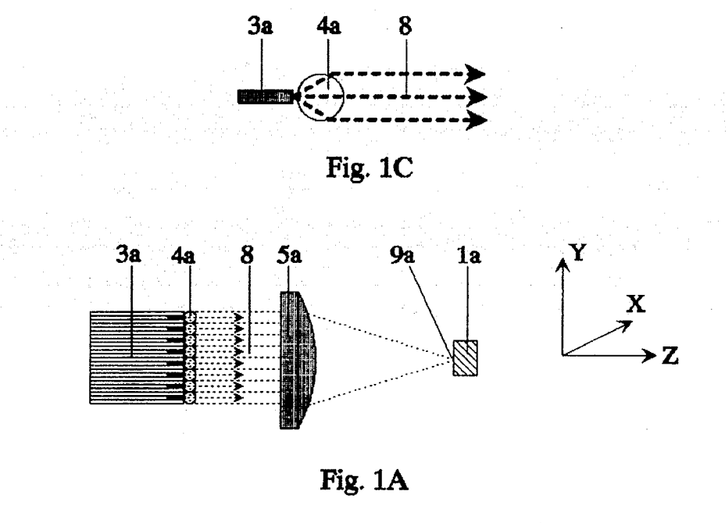
FIGS. 1A–C show the optical design for a pump arrangement which provides an excited region with a line shape pumped by multiple 2-D stacked laser diode bars.
Figure 1B:
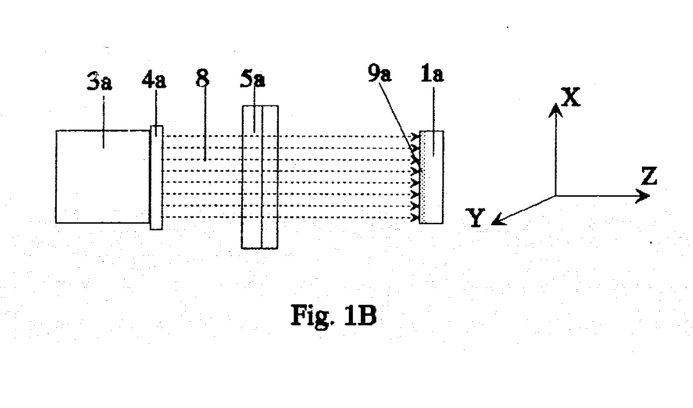

FIGS. 1A–C show the optical design for a pump arrangement which provides an excited region with a line shape pumped by multiple 2-D stacked laser diode bars. This is an exemplary embodiment of the pump configuration in accordance with the present invention. The collimated pump beams 8 emitting from diode bars 3a via a collimating lens 4a are tightly compressed onto a laser bar 1a with a excited region 9a of linear shape along the X direction by a cylindrical lens 5a. Laser bar 1a is made of $Nd:YVO_4$ or other rare earth doped solid state laser material. FIGS. 1A and 1B are front and top plane views respectively. FIG. 1C is a magnified sectional view of a single layer in multiple 2-D diode bars 3a and a relevant collimating rod lens 4a.

The output of each tier in 2-D diode bars 3a is collimated by collimating lens 4a, preferably a length of optical fiber rod lens, which is mounted parallel to and in a spaced relation with one emitter tier of diode bars 3a by precision spacer means to substantially collimate the diode emission in the plane perpendicular to the diode junction plane. The arrays in 2-D diode bars 3a and a group of fiber rods lenses 4a are matched each other geometrically in tier by tier manner. The diameter of fiber rod lens 4a and its refractive index are chosen correctly for the collimating. A resultant array of collimated pump beams 8 are presented toward cylindrical lens 5a. All of them, rod lens 4a, focus lens 5a and the relevant crystal facet of laser bar 1a are antireflection (AR) coated at pumping lights.

As an alternative, several linear array laser-diode bars can be used as the pump source instead of the 2-D stacked laser-diode bars with the above pump arrangement.

Figure 2A:
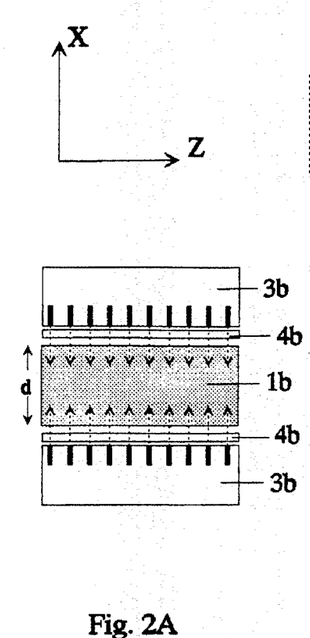
FIGS. 2A–C show the optical design for a pump arrangement which provides an excited region with a thin layer shape pumped by one or multiple couple linear array laser-diode bars.
Figure 2B:
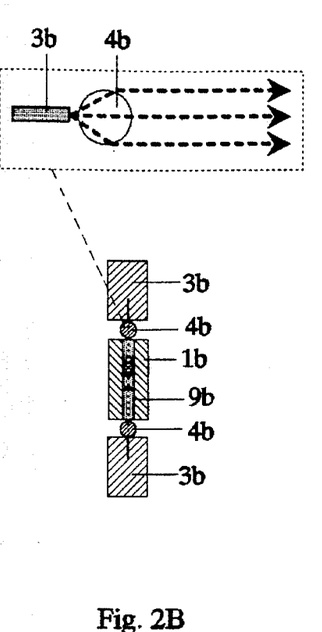
Figure 2C:
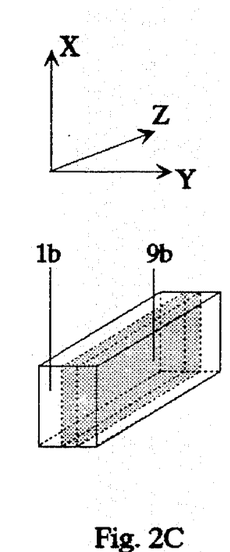

FIGS. 2A–C show the optical design for a pump arrangement which provides an excited region with a thin layer shape pumped by one or multiple couple linear array laser-diode bars. A couple linear array laser-diode bars 3b is symmetrically positioned at both sides of a laser slab 1b. The collimated pump beams emitting from diode arrays 3b via a collimating lens 4b directly into laser slab 1b. An excited region 9b in laser slab 1b has a thin layer shape with the thickness of around 740 micrometers or less to fit in with the $TEM_{00}$ mode size in the Y dimension. FIGS. 2A, 2B and 2C are top plane, front sectional and perspective views respectively. This is an alternative embodiment of the pump configurations in accordance with the present invention.

Laser slab 1b is made of Nd:YAG or other rare earth doped solid state laser material. A preferred linear array laser-diode bar, e.g., the Spectra Diode Laboratories SDL-3400 series with a 10 mm×1 micrometer emitting aperture serve as the 810-nm pump source. The output of linear arrays 3b is collimated by collimating lens 4b, preferably a length of optical fiber rod lens, which is mounted parallel to and in a spaced relation with the emitter layer of linear arrays 3b by precision spacer means to collimate the diode emission in the plane perpendicular to the diode junction plane. The diameter of fiber rod lens 4b and its refractive index are chosen correctly for collimating and producing a thin enough excited layer 9b in laser slab 1b.

An optimized absorption coefficient of pumping light is chosen for maximizing an absorption of pump power at the center area of slab 1b. It is of around $I(d)/I(O)=10\%–13\%$ and leads to slab 1b absorption efficiency over 80%. Here the $I(O)$ is the incident light intensity and $I(d)$ is the intensity of the light emerging from the other side of slab 1b with the path length d. The d is the tall of slab 1b.

Figure 3A:
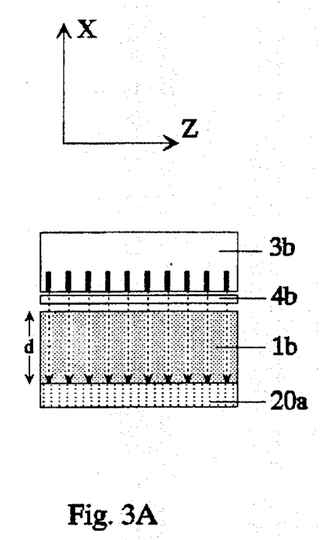
FIGS. 3A–C are a pump arrangement similar to that shown in FIGS. 2A–C, which provides an excited region with a thin layer shape pumped by one or multiple linear array laser-diode bars.
Figure 3B:
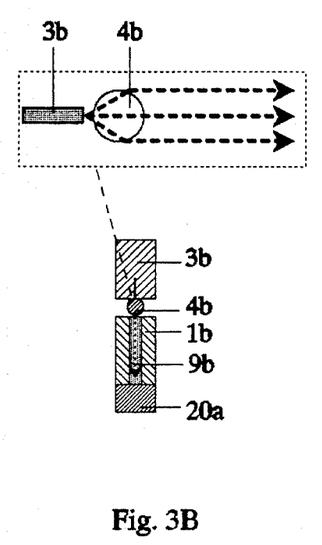
Figure 3C:
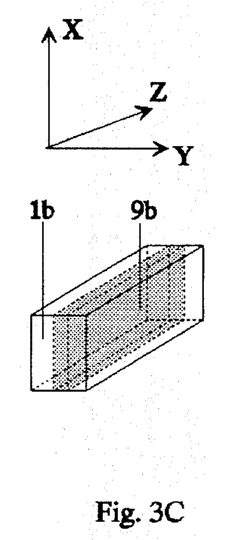

FIGS. 3A–C are a pump arrangement similar to that shown in FIGS. 2A–C, which provides an excited region with a thin layer shape pumped by one or multiple linear array laser-diode bars. The differences between them are that a grating reflector 20a is now used instead of linear array laser-diode bars 4a at one side of slab 1b and a relative smaller d of the tall of slab 1b is chosen now.

Blazed grating reflector 20a, with a blaze angle larger than 38 degree, diffract the unabsorbed pumping light back to slab 1b with a large diffraction angle to maximize the absorption in thin layer 9b. The diffraction beams are also reflected by high reflection coating (HR) at the end of slab 1b. To obtain the highest possible diffraction efficiency, the direction of diffraction that corresponds to the chosen grating order related the wavelength around 810 nm should be made as near to the grating blaze angle as possible. As an alternative, the bottom facet of laser slab 1b with HR coating at pump lights wavelength also can be used as a reflect mirror, to replace grating reflector 20a but with a lopsided pump distribution.

FIGS. 3A, 3B and 3C are top plane, front sectional and perspective views respectively. This is another alternative embodiment of the pump configurations in accordance with the present invention.

FIGS. 4A–D show several similar optical designs for the planar pump arrangements which provide an excited region with a thin layer shape, pumped by multiple 2-D stacked laser diode bars, or several linear array laser-diode bars, or even by broad area LED diodes.

Figure 4A:
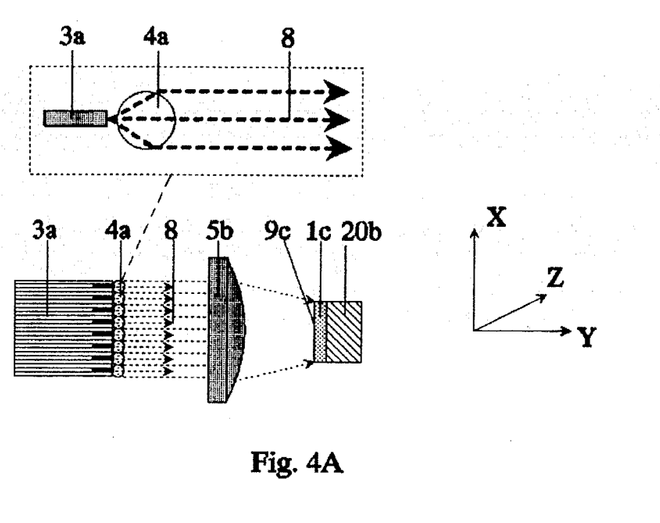
FIGS. 4A–B show the optical design for a pump arrangement with a thin layer pump region pumped by multiple 2-D stacked laser diode bars.
Figure 4B:
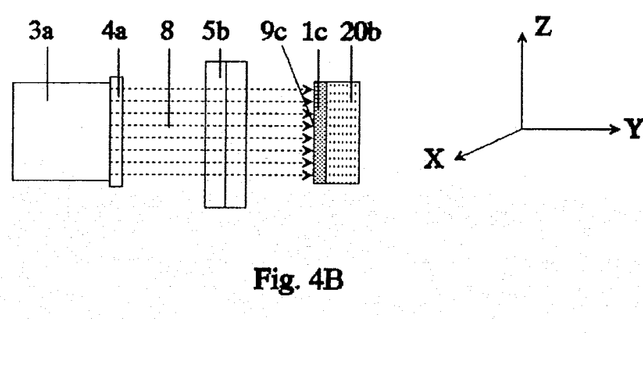

In FIGS. 4A–B, shown the optical design for a pump arrangement with a thin layer pump region pumped by the diode bars. In which a planar laser crystal or laser slab 1c has 1.5 mm thick or less. The collimated pump beams 8 emitting from diode bars 3a via a collimating lens 4a are loosely compressed in X dimension onto laser slab me with an excited region 9c by a cylindrical lens 5b. Slab 1c is positioned off from the focus plane of focus lens 5b to obtain the planar pump.

A grating reflector 20b is placed the opposite side of the pump face of slab 1c. It diffracts the unabsorbed pumping light back to slab 1c with a large diffraction angle to maximize the absorption and to optimize the pump uniformity in laser slab 1c. The diffraction beams are also reflected by high reflection coating (HR) at the end of slab 1c. As an alternative, the bottom facet of laser slab 1c with HR coating at pump lights wavelength also can be used as a reflect mirror, to replace grating reflector 20b but with a lopsided pump distribution.

At present, the shape and the thickness of excited region 9c are dependent on the shape and the thickness of slab 1c. So, in such case, the thickness of slab 1c should be as thin as possible to provide the favorable condition for the mode-matched pumping. Laser slab 1c is made of $Nd:YVO_4$, Nd:YAG or other rare earth doped solid state laser material. FIGS. 4A and 4B are front and top plane views respectively.

Figure 4C:
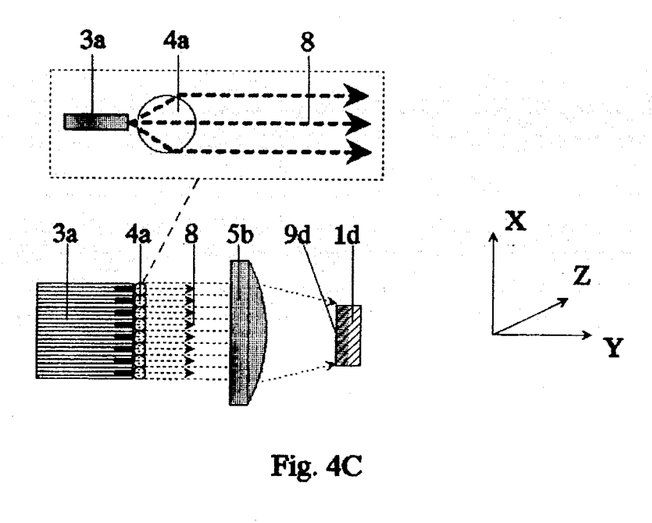
FIGS. 4C–D show an alternative optical design for a pump arrangement with a thin layer pump region pumped by the diode bars.
Figure 4D:
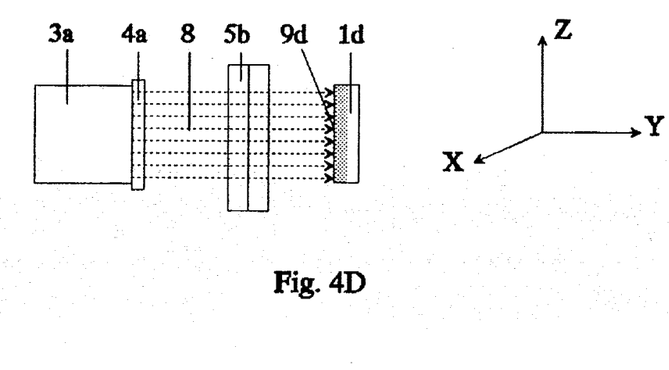

FIGS. 4C–D show an alternative optical design for a pump arrangement with a thin layer pump region pumped by the diode bars. This arrangement is almost the same as that shown in FIGS. 4A–B, except that a planar laser crystal or laser slab 1d, preferably a $Nd:YVO_4$ crystal, has a large absorption coefficient to limit an excited region 9d with a very small thickness in the Y dimension, instead of laser slab 1c. Excited region 9d now is modeled of a thin layer shape naturally and no longer dependent on the shape and the thickness of the laser crystal like above stated in FIGS. 4A–B.

In the above cases, the pumping optics allow the diode bars to stand-off from the laser crystal and the diode bars. On the other hand, while the power density of the pump source is larger enough, the direct coupling can be applied. The face of laser crystal and emitting surface of pump source are in close proximity, and no optics is employed. The pump source can be selected from multiple 2-D stacked laser diode bars and several linear array laser-diode bars, or even the broad area LED diodes.

The historical problem with using diode bars as pump source is that they have exhibited much lower focusability or the poor focusing qualities. The compilation of the emitted beams adds up to a rectangular geometrical beam which possesses a lot of spatial structures. Above mentioned pump arrangements overcome this obstacle, and is of much flexibility and allowance to obtain the expected uniform pump region.

Above mentioned the fiber rod lens in FIGS. 1A–C, 2A–C, 3A–C and 4A–D is as a one-dimensional collimating lens to collimate the beam divergence in the plane perpendicular to the diode junction plane. On the other hand, the beam divergence in the plane parallel to the diode junction plane is much smaller relatively (around 5–10 degree) and beneficial to obtaining a uniform pumping along the direction parallel to the fiber rod lens due to the space-sharing or space-overlapping between two pump beams, which come from two adjacent diode emitters in the same emitter tier.

All of above mentioned laser crystals are antireflection coated on the pump face to reduce coupling losses. And the opposite face or side faces are bonded to a copper heat sink block, which is coupled to liquid-cooled heat exchanger.

Those approaches mentioned above from FIGS. 1A–C to FIGS. 4A–D provide the pump regions with a linear shape or a thin planar shape. They are the remarkable way to provide a favorable condition for the mode-matched pumping and for achieving $TEM_{00}$ mode and single mode operation with both end-pumping scheme and side-pumping scheme. It also is for maximizing an absorption of pump power in a small pump volume and, consequently, maximizing population inversion density or laser gain. On the other hand, however, for effective mode matching, it is required to expand the diameter of the $TEM_{00}$ beam in order to match the excited region which has a larger volume. For this purpose, accordingly, a prism beam expander (PBE) is applied as a mode-expanding device for expanding $TEM_{00}$ mode in one dimension with a compact cavity. Since the prism beam expander was disclosed by G. K. Klauminger (U.S. Pat. No. 4,127,828) and others, It has been widely and successfully used in the pulsed dye laser and made important contribution to dramatically improving the performances.

Figure 5:
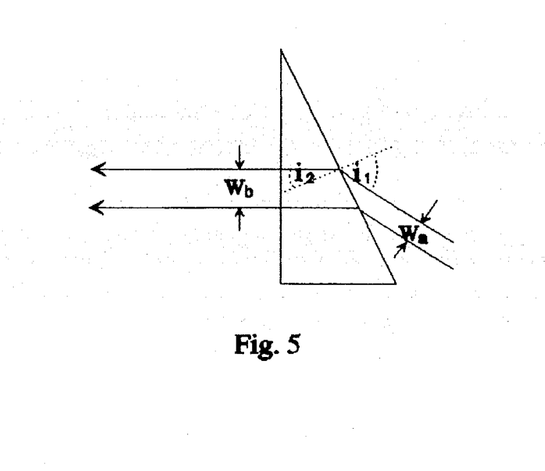
FIG. 5 shows the conception of the beam-expanding prism as one dimensional beam-expanding means.

The conception of the beam-expanding prism as one dimensional beam-expanding means is shown in FIG. 5. The factor of expansion can be calculated when the entrance beam passes through the prism. Where $i_1$ and $i_2$ are the angles of incidence and refraction respectively at the first surface of the prism. $W_a$ and $W_b$ are the beam waist before and after expanded respectively. Defining the expansion or the magnification of the PBE $$M = W_b/W_a = [(n^2 - \sin^2 i_1)/(n^2 - n \sin^2 i_1)]^{1/2} = \cos i_2 / \cos i_1.$$

If the expansion factor for one prism is not large enough to satisfy the present requirement, two or more prism can be used to obtain a bigger expansion factor. The expansion factor provided by n prisms is $$M = M_1 \times M_2 \times \ldots \times M_n = \prod_i^n M_i.$$

Figure 6:
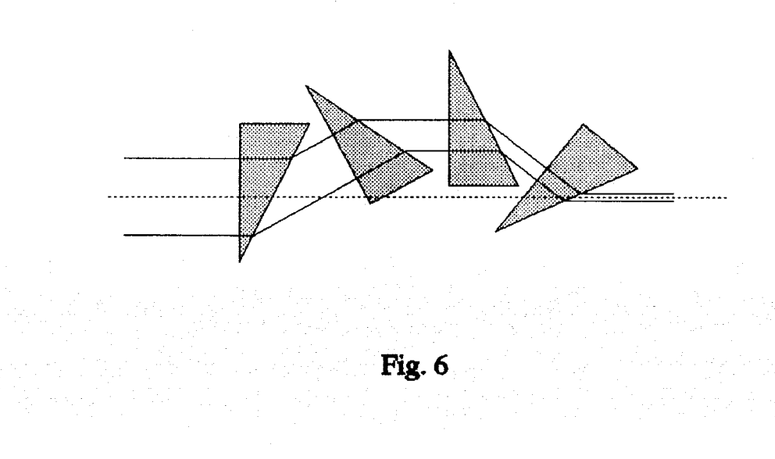
FIG. 6 shows a prism beam expander consisting of four prisms.

FIG. 6 shows a prism beam expander consisting of four prisms. The magnification M with this system typically is of from 25 X to 200 X. All optical facets of the prisms are highly antireflection coated at the laseing wavelength in P polarization (oriented parallel to incident plane). The reflection loss at one single optical surface is designed to be less than 0.003. Indeed, it is the most important factor in the successful implementation of the present invention.

Figure 10:
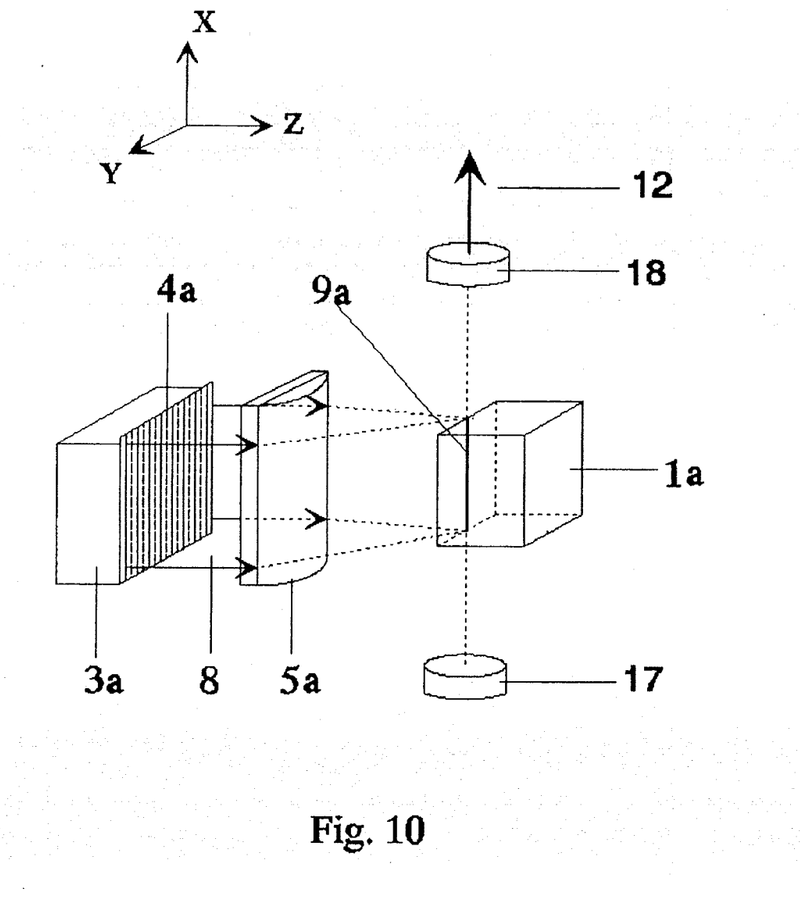
FIG. 10 is a perspective view of a side-pumping resonator configuration with a pump region of the linear shape pumped by multiple 2-D stacked laser diode bars.

As to the XYZ directions presented in the figures with this invention, the Z direction is always along the optical axis of laser cavity except in FIG. 10. The dimension of cavity modes in XZ plane is expanded and the dimension of cavity modes in YZ plane is not expanded by the prism beam expander.

Figure 7:
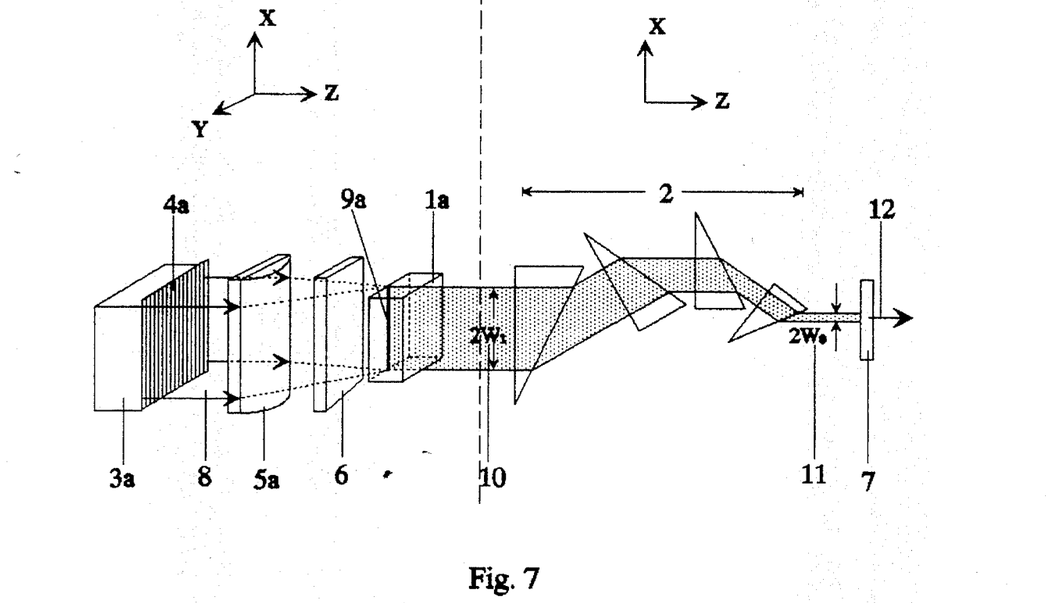
FIG. 7 is a plane-perspective view of a resonator with the end-pumping configuration with a pump region of the linear shape pumped by multiple 2-D stacked laser diode bars.

FIG. 7 is a plane-perspective view of a resonator with the end-pumping configuration with a pump region of the linear shape pumped by multiple 2-D stacked laser diode bars. The relevant pump arrangement is shown in FIGS. 1A–C. It is an exemplary embodiment of the pump/cavity arrangement in accordance with the present invention.

The left half is a perspective view for the pump arrangement shown and described in FIGS. 1A–C. The right half is a plane view of the rest part of the resonator. A laser resonator includes the pump arrangement of laser bar 1a, diode bars 3a, collimating lens 4a and cylindrical lens 5a, a prism beam expander 2 consisting of four prisms, and two mirrors 6, 7. One mirror 7 is partially reflective to the laser light in order to obtain output 12, and other mirror 6 may reflect laser light totally. The lasing light is reflected by the mirror means to travel back and forth between the laser resonance mirrors, while a part of the lasing light is outputted from mirror 7, as an output coupler.

Here the beam waist 11 and 10, i.e., $W_0$ and $W_1$ are the beam waist before and after expanded respectively, and $M = W_1/W_0$. A preferred cavity length is around 15 cm. Cavity mirrors 6, 7 may have the same radius of curvature on the order of several times longer than the length of the cavity, except a much larger radius in X dimension with mirror 6. Such a large-radius mirror resonator has a reasonable alignment stability. Otherwise, mirror 6 may be a plane mirror. As an alternative, the cavity may be further simplified while the crystal facet of laser bar 1a is served as the back mirror instead of mirror 6.

One of the very important parameters in present design is the magnification M of PBE 2. In fact, the $TEM_{00}$ mode operation can be realized by present design as long as the magnification M of PBE 2 is designed large enough to make the mode size in X dimension larger than the length of excited region 9a, thus leading to the lasing area itself acting as the mode selecting aperture. Under this condition, lasing is occurred in the $TEM_{00}$ mode without an intracavity aperture even when pump power exceed threshold considerably. As an example, while the length of excited region 9a in X dimension is 20 mm, the beam waist in X dimension before expanded is $W_0$ of 320 micrometers, thus the magnification M is chosen larger than 30 X.

Other two of very important parameters in present design are the line width and the depth of excited region 9a. The active substance in laser bar 1a is excited by the compressed pump light with a linear region 9a along the X direction. The line width of excited region 9a is controlled by the pump-focusing coupling of around 740 micrometers or less to fit in with the $TEM_{00}$ mode size in the Y dimension. The depth of excited region 9a, i.e., the absorption depth in the Z dimension, is dependent on the absorption coefficient of the laser material at the pumping lights.

There is a major advantage for obtaining single longitudinal mode operation with this configuration based on minimizing the spatial hole-burning effect. The relevant method applied for the diode-pumped solid-state laser is described by G. J. Kintz and T. Baer in their paper of IEEE J. QE-26 (1990)9,1457 as follows. The single mode operation can be realized by placing a homogeneously broadened gain medium with a short absorption depth at an end mirror of a cavity. All the longitudinal modes have a common spatial node at the surface of the mirror, and access to the same population inversion since in this narrow excited region. The mode with the highest cross section for stimulated emission will oscillate first, saturation the population inversion and reducing the gain of the medium to the threshold gain of this first mode. This modification of the population inversion reduces the gain available to the other longitudinal modes. Other cavity modes with lower cross sections can not reach threshold since they use the same population distribution as the highest gain mode.

To realize single mode operation with the present configuration, several approaches have been considered.

First, mirror 6 and laser bar 1a are in close proximity. Or as an alternative, the crystal facet of laser bar 1a with the HR coating is served as the back mirror instead of mirror 6.

Second, the absorption depth of region 9a is controlled less than $\lambda^2/k(FWHM)$ by choosing the laser material with a large absorption coefficient, then single mode operation can be obtained directly. Here the $\lambda$ is the lasing wavelength, the FWHM is the lasing bandwidth of the gain medium or laseing material. The range of the parameter k is around from 5 to 10. This value is dependent on the power levels the linewidth and the polarization of the pumping light. As an example, while the FWHM is 1 nm, the absorption coefficient is chosen around 70 cm$^{-1}$. And the corresponding absorption depth is of about a few hundred micrometers. A preferred laser material with large absorption coefficient is the Nd:YVO$_4$ crystal.

Third, while the absorption depth is not small enough, or the FWHM of the laseing bandwidth is too large to satisfy the requirement above, a narrow linewidth operation is occurred instead of the single mode operation. However, it still is a great promotion to realize the single mode operation with following measures. In this case, (1) a low-finesse etalon 14 (see FIG. 8), or (2) a Littrow prism mirror instead of output mirror 7 and 15 in FIGS. 7, 8, or (3) an extra dispersion prism inserted between PBE 2 and the output mirror, can be used to gain the single mode operation. All these measures is for obtaining a pre-narrowband operation with more lower optical loss comparing with inserting a typical etalon. On such situations, the value of the short absorption depth is around 1 mm to a few millimeters.

Fourth, as an alternative to above, while a flat crystal facet of laser bar 1a is served as the back mirror instead of mirror 6, and the thickness of laser bar in Z dimension is larger than 6 mm, thus laser bar 1a can be made as a laser-bar-etalon by itself with a correct coating on the other side. So it is supplanting inserted etalon 14 now.

In the above cases, lasers pumped along the optical axis use dichroic coatings at mirror 6 to transmit the pump light into the gain medium and reflect the laser light back into the optical cavity. These coatings have limited transmission and typically result in a 10 to 15 percent loss of the incident pump power. As an alternative for the pump arrangement to eliminate this drawback, the pump light incident on the gain medium at an angle with the off-axis geometry can be applied while the absorption depth of region 9a is very small.

Figure 8:
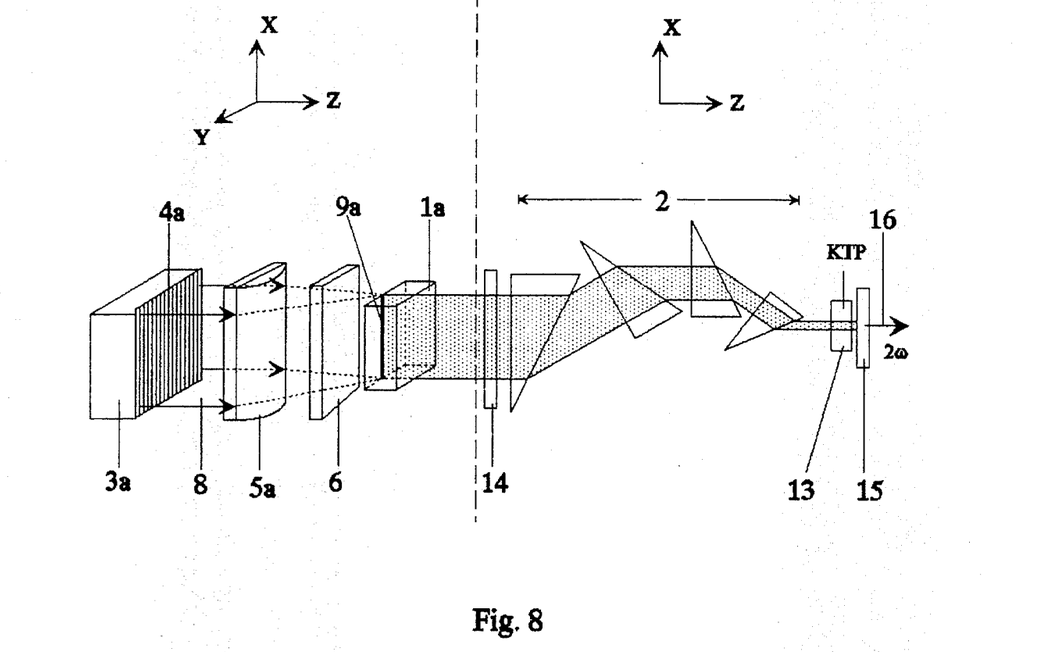
FIG. 8 is a plane-perspective view of a relevant arrangement of that shown in FIG. 7 for intracavity frequency doubling.

FIG. 8 is a plane-perspective view of a relevant arrangement of that shown in FIG. 7 for intracavity frequency doubling. All of them are the same as that in FIG. 7, except that a mirror 15 replaces mirror 7, and a nonlinear crystal 13, preferably a KTP crystal, is placed between mirror 15 and PBE 2 for the frequency doubling. Both mirrors 6, 15 have HR coating for the fundamental radiation and front mirror 15 is transparent (HT) for a second-harmonic output 16. Both faces of nonlinear crystal 13 are AR coated for fundamental radiation and rear face of crystal 13 is HR coated for the second harmonic radiation so as to reflect it toward mirror 15 as an output, since intracavity harmonic generation produces a beam of harmonic power in each of two directions. An inserted etalon 14, or other measures stated above is for the single mode operation and the amplitude noise suppression.

Considering the deployment of PBE 2, this arrangement has an advantage to obtain the harmonic power of a better stability due to the absence of internal beam focusing and with a large tolerance of cavity length, and due to the size of beam waist W$_0$ is rather stable with the mirror misalignment comparatively. It is an embodiment of the optical setup for the intracavity frequency doubling in accordance with the present invention.

Figure 9:
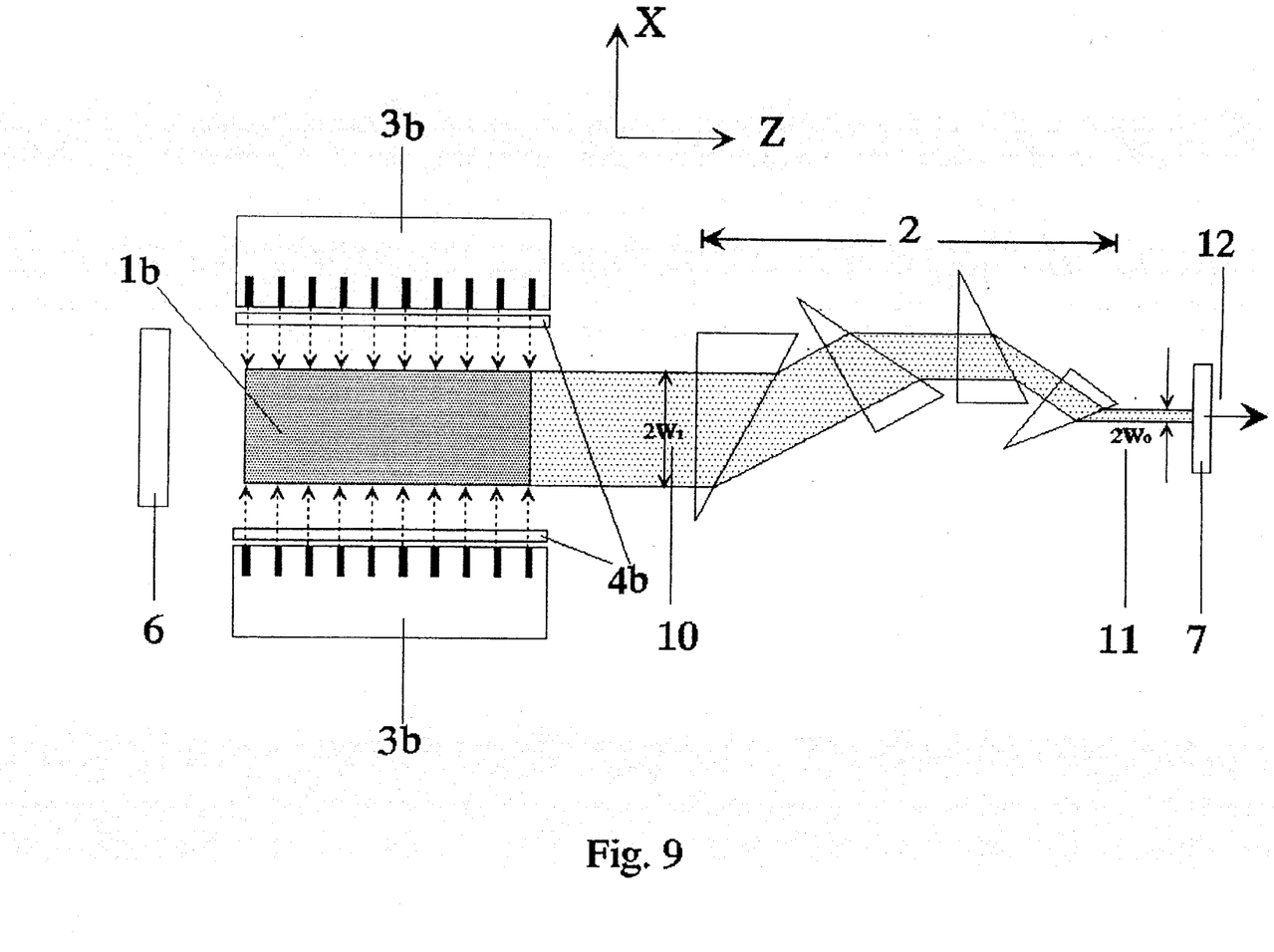
FIG. 9 is a plane-sectional view of a side-pumping cavity configuration with an excited region of the thin layer shape pumped by one or multiple couple linear array laser-diode bars.

FIG. 9 is a plane-sectional view of a side-pumping cavity configuration with the pump region of a thin layer shape. The relevant pump arrangements are shown in FIGS. 2A–C, 3A–C, and 4A–D. The preferred condition in these pump arrangements is contented with the pump power density within the laser material to be over 5 W/mm$^3$. This arrangement is almost the same as that shown in FIG. 7, except that one of pump arrangements shown in FIGS. 2A–C, 3A–C or 4A–D, particularly shown in FIGS. 2A–C, replaces the pump arrangement shown in FIGS. 1A–C or FIG. 7. The left half is a sectional view for the pump arrangement shown and described in FIGS. 2A–C. The right half is a plane view of the rest part of the resonator. It is an alternative embodiment of the pump/cavity arrangement in accordance with the present invention. The redundant description will be avoided for simplicity.

Moreover, as another alternative, this side-pumped configuration also can be designed with the pump region of a line shape similar to that shown in FIG. 7. The related pump arrangement is mainly based on that shown in FIG. 4A–B, except a line pump region instead of the layer pump region. Slab 1c is now positioned at the focus plane of focus lens 5b to obtain a pump region of the line shape. And the sign of the axes of the X and the Z in FIG. 4A–B should be exchanged to fit the present case for the space-coupling.

All of above mentioned cavity arrangements require inserting the PBE for the mode-expanding. Now, finally, the simplest cavity in this invention is an exemption without the PBE as shown in FIG. 10. This scheme is the ideal one as both an oscillator and an amplifier.

FIG. 10 is a perspective view of a side-pumping resonator configuration with a pump region of the linear shape pumped by multiple 2-D stacked laser diode bars. The relevant pump arrangement is shown in FIGS. 1A–C. In fact, it is with the same pump arrangement but with a different cavity settlement from that as shown in FIG. 7. In FIG. 7, the pump/cavity arrangement with the end-pumping scheme, now is with the side-pumping scheme. It is another exemplary embodiment of the pump/cavity arrangement in accordance with the present invention.

At present, the optical axis of the laser resonator is along the X direction and is coaxial with excited linear region 9a. A front mirror 18 is partially reflective to the laser light in order to obtain output 12. A rear mirror 17 is with HR coating. A conventional stable resonator is used here without the prism beam expander.

Same as stated above in FIG. 7, both the line width and the depth of excited region 9a now also are required to be seriously controlled. The line width and the absorption depth of excited region 9a are controlled by the pump-focusing optics and by choosing the laser material with a large absorption coefficient respectively. Both are around 540 micrometers or less to fit in with the TEM$_{00}$ mode size. Thus, the mode-matched pumping can be achieved by using a conventional stable resonator without the PBE due to the small enough pump volume at present situation. While the depth of excited region 9a is not small enough, a PBE is still needed to be inserted for mode-expanding.

On the other hand, a ring cavity configuration is also applied to obtain the more better performances for eliminating spatial hole burning and its associated longitudinal mode instabilities with the intracavity frequency doubling.

This construction can also be configured to operate as optical amplifiers with the output coupler removed.

While above description contains many specificities, these should not be construed as limitations on the scope of the invention, but rather as some exemplifications of preferred embodiments thereof. Many other variations are possible.

CONCLUSION, RAMIFICATIONS AND SCOPE OF INVENTION

The present invention provides unique and remarkable pump/cavity configurations for laser diode bars pumped solid-state lasers, to obtain the mode-matched pumping with a compact cavity and to achieve $TEM_{00}$ mode and single mode operation, resulting in a series of advanced diode-pumped solid-state lasers with high efficiency, facilitaty, versatility and diverse output power. With this invention, the major disadvantages of both end-pumping and side-pumping scheme have been eliminated considerably.

The deployment of the prism beam expander as a mode-expanding device is characterized by this invention and has a number of attractive benefits.

First the prism beam expander has much looser tolerance and less optical distortion, so it can be much easier to use, to make alignment and arrangement by comparison.

Second, the magnification M of the prism beam expander can be reached over a large number, even up to larger than 500 X available. It is the major contribution to achieve the mode-matched pumping and the $TEM_{00}$ mode operation.

Third, a cavity with the prism beam expander has a small enough beam waist with the high power density, but without the internal beam focusing as appearing at some cavity configurations. So such situation results in more stable cavity configurations and more stable intracavity frequency doubling and mixing, as well as high amplitude stability without the serious cavity length control.

Fourth, the most important and very unique one is that the cavity with the prism beam expander is compact and flexible, and has a large mode volume to realize the mode-matched pumping.

The major limitation on the prior arts of the diode-pumped solid-state laser is the efficiency and effectiveness of the pump source and it is caused by the limited focusability or the poor focusing qualities of the output beams from the diode lasers. In methods according to the invention, the unique pump arrangements with the conventional optical elements provide the excited region with a linear shape or a thin planar shape, thus overcome this disadvantage dramatically and largely improve performances to the practical limit of the art.

Moreover, there are several significant advantages with the present cavity arrangements. The exemplary one is shown in FIG. 7.

First, in fact, it is an one-end-multi-pumping arrangement. An excited region is a line instead of a point to yield a more large pump area to allow raising pump power without limitation. Therefore the major barrier of the end-pumping is virtually overcome by this configuration.

Second, the excited region to be modified from a point to a line result in that the undesired thermo-optic effects are largely reduced at least in one dimension.

Third, the $TEM_{00}$ mode operation now is achieved simply as long as the magnification M of the prism beam expander is larger enough so that the lasing area itself acting as the mode selecting aperture.

Fourth, single longitudinal mode operation is obtained more easily with a short absorption depth in the pump region.

Overviews and summaries of the present invention, it supports a wide variety of laser devices. Up to the limits of pump power, pump region, pump scheme, and cavity arrangements. It offers the easiest way to employ many diode bars, pulsed or cw, and the very simple pumping coupling optics with good coupling efficiency. One of the constructions in this invention also can serve as an amplifier. The remarkable geometries of the approaches opens the resonator to applications of various prior arts, such as Q-switching, cavity-dumping, mode locking, frequency conversion and frequency mixing.

The invention being thus described, it is obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A laser pump/cavity arrangement, which can be used for regular lasers and tunable lasers, comprising:

a laser cavity forming means including an output mirror means and a rear mirror means serving as a light reflector;

a laser material means within said cavity;

a pump source means to provide the relevant pump light for pumping said laser material means;

a gain region within said laser material means;

a pumping coupling optics means placed between said pump source means and said laser material means for coupling the pump light from said pump source means to said laser material means so as to produce said gain region; and an one-dimensional beam expander means inserted within said laser cavity between said laser material means and said output mirror means;

wherein (1) said gain region, which is positioned very close to said rear mirror means, is designed in the shape of a line vertical to the optical axis of said laser cavity in contrast to the commonly-used horizontal line, whereby minimizing or eliminating the spatial hole-burning effect to facilitate single longitudinal mode operation, and whereby resulting in scalable pumping capabilities and in a great reduction of the undesired thermo-optic effects, as well as leading to overcoming the key technical barrier and major limitation on the efficiency and effectiveness of diode lasers as the pump source, and on high power operation for diode end-pumped solid-state lasers;

(2) said one-dimensional beam expander means expands the $TEM_{00}$ mode of said laser cavity in the dimension along the line defined by said gain region, whereby to obtain mode-matched pumping and $TEM_{00}$ mode operation, and to provide both large and small beam waists in said laser cavity so as to be able to achieve mode-matched pumping and efficient intracavity frequency conversion at the same time;

(3) said pumping coupling optics means includes a collimating lens means for collimating said pump light if said pump light is not collimated light, and an one-dimensional focus lens means for tightly compressing the collimated pump light onto said laser material means for producing said gain region in the shape of a line;

(4) two parameters, line size Y and Z are introduced hereof to designate the two dimensions of the cross section of the line gain region; said line size Z is defined to be the dimension of said cross section parallel to the optical axis of said laser cavity; and said line size Y is defined to be the dimension of said cross section along the dimension unexpanded by said beam expander means and perpendicular to the optical axis of said laser cavity;

(5) said line size Y is predetermined to match the $TEM_{00}$ mode size of said laser cavity approximately in the unexpanded dimension; and (6) based on reducing the spatial hole-burning effect, said line size Z is predetermined to be the value, which is less than a few millimeter and, equivalently and more precisely in the frequency domain in the laser physics, should lead to that the laser oscillation within the laser cavity has an oscillating mode interval equal to or larger than twice that of the free spectral range of the laser cavity.

2. A laser arrangement of claim 1, based on eliminating the spatial hole-burning effect, wherein said line size Z is predetermined to be the value, which is less than 1 millimeter and should directly lead to single longitudinal mode operation; otherwise further comprising an optical element means within said cavity for pre-narrowband operation, whereby to obtain single longitudinal mode operation with much lower optical loss compared with inserting a typical etalon.

3. A laser arrangement of claim 2, wherein said optical element means is a device selected from the group including a) a low-finesse etalon positioned between said laser material means and said prism beam expander means, b) a Littrow prism mirror instead of output mirror means, and c) an extra dispersion prism positioned between said prism beam expander means and said output mirror means.

4. A laser arrangement of claim 1, wherein
   (1) the pump arrangement is configured with the end-pumping scheme, including the off-axis end-pumping geometry; the direction of said pump light is set along said dimension Z;
   (2) the absorption coefficient of said laser material means at the pump wavelength is predetermined for obtaining a short pump depth so as to define said line size Z; and
   (3) the compressibility of said one-dimensional focus lens means is predetermined so as to define said line size Y.

5. A laser arrangement of claim 1, wherein
   (1) the pump arrangement is configured with the side-pumping scheme; the direction of said pump light is set along said dimension Y;
   (2) the absorption coefficient of said laser material means at the pump wavelength is predetermined for obtaining a short pump depth so as to define said line size Y; and
   (3) the compressibility of said one-dimensional focus lens means is predetermined so as to define said line size Z.

6. A laser arrangement of claim 1, wherein said laser material means is a rare earth doped solid-state laser medium; said pump source means is selected from the group including 2-D stacked laser diode bars and a group of linear array laser diode bars.

7. A laser arrangement of claim 6, wherein said collimating lens means is a group of fiber rod lenses, which is placed at the front of said diode bars for collimating said pump light, and said one-dimensional focus lens means is a cylindrical lens, which is placed at the front of said laser material means for tightly compressing said collimated pump light to a narrow line.

8. A laser arrangement of claim 1, wherein
   (1) said beam expander means is a prism beam expander means comprising at least one prism, whose optical surfaces are of the Brewster's angle otherwise are highly antireflection coated at a lasing wavelength with the reflection loss at single optical surface less than 0.003 approximately, particularly for cw operations; and
   (2) when the frequency conversion is required, further comprising a nonlinear crystal means positioned between said prism beam expander means and said output mirror means, whereby resulting in a favorable condition for high quality and high efficient intracavity frequency conversion, and leading to an extraordinary advantage in elimination of the optical damage of said nonlinear crystal means and in the use of long nonlinear materials due to the absence of internal beam focusing, and due to the fact that the size of beam waist is constant within the range between said prism beam expander means and said output mirror means.

9. A laser pump/cavity arrangement is configured with the side-pumping scheme, which can be used for regular lasers and tunable lasers, comprising:
   a laser cavity forming means including an output mirror and a rear mirror means serving as a light reflector;
   a laser material means within said cavity;
   a pump source means to provide the relevant pump light for pumping said laser material means;
   a gain region within said laser material means produced by said pump light; and
   an one-dimensional beam expander means inserted within the laser cavity between said laser material means and said output mirror;
wherein
   (1) said gain region is designed in the shape of a thin layer, whereby resulting in a) a favorable condition for mode-matched pumping, b) a great flexibility in pump condition and pump arrangement with uniform pump, c) maximizing the absorption of pump power in said gain region thus leading to a high gain, d) scalable pumping capabilities, e) a great reduction of the undesired thermo-optic effects, as well as f) overcoming the key technical barrier and major limitation on the efficiency and effectiveness of diode lasers as the pump source;
   (2) the shape and absorption coefficient of said laser material means at the pump wavelength are predetermined in the optimized condition for a) producing said gain region in the shape of a thin layer, b) concentrating the pump power in the central lasing area, c) maximizing the absorption efficiency of said laser material means, and d) obtaining uniform pump; (3) three parameters, dimension X, Y and Z, are introduced hereof for designating the three dimensions of said gain region; dimension X is defined to be the size of said gain region along the dimension expanded by said one-dimensional beam-expander means, dimension Y is defined to be the thickness of said gain region, and dimension Z is defined to be the size of said gain region along the optical axis of said laser cavity, respectively;
   (4) said one-dimensional beam expander means expands the $TEM_{00}$ mode of said laser cavity along said dimension X, whereby to obtain mode-matched pumping and $TEM_{00}$ mode operation, and to provide both large and small beam waists in one compact cavity so as to be able to achieve mode-matched pumping and efficient intracavity frequency conversion at the same time; and
   (5) said dimension Y is predetermined to be around 3 millimeter or less so as to match the $TEM_{00}$ mode size of said laser cavity approximately in the unexpanded dimension.

10. A laser arrangement of claim 9, wherein
   (1) the direction of said pump light is set along said dimension Y;
   (2) said laser material means includes a rare earth doped solid-state laser medium, whose shape is predetermined to be a thin layer with thickness around 3 millimeter or less so as to define said dimension Y;

(3) said pump source means is selected from the group including 2-D stacked laser diode bars, a group of linear array laser diode bars, broad area LED diodes and a group of flashlamps;

(4) when the power density within said gain region directly provided by said pump source is over 5 W/mm$^3$ approximately, the direct coupling can be applied; in such case, the face of the laser medium and the emitting surface of said pump source are in close proximity without intervening optics; and (5) said pump light can be arranged symmetrically onto two opposite sides of said laser material means, whereby to facilitate very high power pump and very high power laser operation; and said absorption coefficient of said laser material means in said optimized condition is chosen to be the value, which leads to I(t)/I(O)=10%–13% around, here I(O) is the incident light intensity and I(t) is the intensity of the light emerging from the other side of said laser material means with a path length t equal to said thickness of said laser material means.

11. A laser arrangement of claim 9, wherein (1) the direction of said pump light is set along said dimension Y;

(2) said laser material means includes a rare earth doped solid-state laser medium, whose shape is predetermined to be a thin layer with thickness around 3 millimeters or less so as to define said dimension Y;

(3) said pump source means is selected from the group including 2-D stacked laser diode bars and a group of linear array laser diode bars;

(4) and further comprising an one-dimensional collimating lens means, such as a group of fiber rod lenses, placed at the front of said laser diode bars for collimating;

(5) and further comprising a blazed grating reflector placed on the opposite side of the pump face of said laser material means for diffracting the unabsorbed pump light back to said laser material means with a large diffraction angle to maximize the absorption and to facilitate the uniform pump; and (6) the power density within said gain region directly provided by said pump source should be over 5 W/mm$^3$ approximately, otherwise further comprising an one-dimensional focus lens means, such as a cylindrical lens, placed at the front of said laser material means for coupling and for compressing said pump light onto said laser material means whereby densifying pump power to be over 5 W/mm$^3$ approximately in said gain region so as to obtain a sufficient laser gain.

12. A laser arrangement of claim 9, wherein (1) the direction of said pump light is set along said dimension Y;

(2) said laser material means includes a rare earth doped solid-state laser medium;

(3) said pump source means is selected from the group including 2-D stacked laser diode bars and a group of linear array laser diode bars;

(4) and further comprising an one-dimensional collimating lens means, such as a group of fiber rod lenses, placed at the front of said laser diode bars for collimating;

(5) the absorption coefficient of said laser material means at the pump wavelength is predetermined for obtaining a short pump depth so as to define said dimension Y;

(6) the power density within said gain region directly provided by said pump source should be over 5 W/mm$^3$ approximately, otherwise further comprising an one-dimensional focus lens means, such as a cylindrical lens, placed at the front of said laser material means for coupling and for compressing said pump light onto said laser material means whereby densifying pump power to be over 5 W/mm$^3$ approximately in said gain region so as to obtain a sufficient laser gain.

13. A laser arrangement of claim 9, wherein (1) the direction of said pump light is set along said dimension X;

(2) said laser material means includes a rare earth doped solid-state laser medium;

(3) and further comprising a pumping coupling optics means placed between said pump source means and said laser material means for coupling the pump light from said pump source means to said laser material means so as to produce said gain region in the shape of a thin layer; the sectional profile of said pump light within said gain region is a narrow line along said dimension Z, whose width defines said dimension Y; and (4) further comprising a blazed grating reflector placed on the opposite side of the pump face of said laser material means for diffracting the unabsorbed pump light back to said laser material means with a large diffraction angle to maximize the absorption and to facilitate the uniform pump.

14. A laser arrangement of claim 13, wherein (1) said pump source means is one or more linear array laser diode bars placed at one side of said laser material means; and (2) said pumping coupling optics means is one or more one-dimensional collimating lenses, such as fiber rod lenses, which are placed at the front of said linear array laser diode bar or bars for collimating said pump light onto said laser material to produce said gain region in the shape of a thin layer.

15. A laser arrangement of claim 13, wherein (1) said pump source means is selected from the group including 2-D stacked laser diode bars and a group of linear array laser diode bars; and (2) said pumping coupling optics means includes a collimating lens means for collimating said pump light if said pump light is not collimated light, and an one-dimensional focus lens means for tightly compressing the collimated pump light onto said laser material means for producing said gain region in the shape of a thin layer.

16. A laser arrangement of claim 9, wherein (1) the direction of said pump light is set along said dimension X;

(2) said laser material means includes a rare earth doped solid-state laser medium, whose size along said dimension X is d;

(3) said pump source means is one or more linear array laser diode bars placed symmetrically at two opposite sides of said laser material means;

(4) further comprising one-dimensional collimating lenses, such as fiber rod lenses, which are placed at the front of said linear array laser diode bars for collimating said pump light onto said laser material to produce said gain region in the shape of a thin layer; the sectional profile of said pump light within said gain region is a narrow line along said dimension Z, whose width defines said dimension Y; and (5) said absorption coefficient of said laser material means in said optimized condition is chosen to be the value, which leads to I(d)/I(O)=10%–13% around, here I(O) is the incident light intensity and I(d) is the intensity of the light emerging from the other side of said laser material means with a path length d.

17. A laser arrangement of claim 9, wherein (1) said beam expander means is a prism beam expander means comprising at least one prism, whose optical surfaces are of the Brewster's angle otherwise are highly antireflection coated at a lasing wavelength with the reflection loss at single optical surface less than 0.003 approximately, particularly for cw operations; and (2) when the frequency conversion is required, further comprising a nonlinear crystal means positioned between said prism beam expander means and said output mirror means, whereby resulting in a favorable condition for high quality and high efficient intracavity frequency conversion, and leading to an extraordinary advantage in elimination of the optical damage of said nonlinear crystal means and in the use of long nonlinear materials due to the absence of internal beam focusing, and due to the fact that the size of beam waist is constant within the range between said prism beam expander means and said output mirror means.

18. A laser pump/cavity arrangement with the side-pumping scheme for diode-pumped solid-state lasers, which can also be used for diode-pumped tunable solid state lasers and diode-pumped laser amplifiers, comprising:

a laser cavity forming means;

a solid-state laser material means within said cavity;

a laser diode means selected from the group consisting of 2-D stacked diode bars and a group of linear array laser diode bars, to provide the relevant pump light for pumping said laser material means;

a gain region within said laser material means; and a pumping coupling optics means placed between said pump source means and said laser material means for coupling the pump light from said pump source means to said laser material means so as to produce said gain region;

wherein (1) said gain region is designed in the shape of a line along the optical axis of the laser cavity, whereby resulting in a) a favorable condition for mode-matched pumping, b) scalable pumping capabilities, c) a large flexibility in pump conditions, and d) overcoming the key technical barrier and major limitation on the efficiency and effectiveness of diode lasers as the pump source;

(2) the absorption coefficient of said laser material means at the pump wavelength is predetermined and large enough for obtaining a short pump depth so as to produce said gain region in the shape of a line whose size is around 2 millimeter or less to match the relevant mode size of said laser cavity; and (3) said pumping coupling optics means includes an one-dimensional collimating lens means, such as a group of fiber rod lenses, placed at the front of said laser diode means for collimating the pump light if the pump light is not collimated light, and an one-dimensional focus lens, such as a cylindrical lens, placed at the front of laser material means, whose compressibility is predetermined to be powerful enough for tightly compressing the collimated pump light onto said laser material means, so as to produce said gain region in the shape of a line whose size is around 2 millimeter or less to match the relevant mode size of said laser cavity.

19. A laser arrangement of claim 18, wherein said laser cavity forming means comprises an output mirror and a rear mirror means serving as a light reflector.

20. A laser arrangement of claim 18, wherein the laser cavity is configured to be a ring cavity for eliminating spatial hole burning and the related longitudinal mode instabilities in the case of intracavity frequency conversion.

\* \* \* \* \*